(12) United States Patent
Schubert (10) Patent No.: US 11,335,068 B2
(45) Date of Patent: May 17, 2022

(54) SYSTEMS AND METHODS FOR USER INTERACTION WITH ARTIFICIAL REALITY ENVIRONMENTS

(71) Applicant: Facebook Technologies, LLC, Menlo Park, CA (US)

(72) Inventor: Martin Schubert, San Francisco, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/940,238

(22) Filed: Jul. 27, 2020

(65) Prior Publication Data

US 2022/0028171 A1 Jan. 27, 2022

(51) Int. Cl.
| | |
|---|---|
| *G06T 19/00* | (2011.01) |
| *G06F 3/01* | (2006.01) |
| *G06F 3/0346* | (2013.01) |
| *G06T 15/06* | (2011.01) |

(52) U.S. Cl.
CPC ............ *G06T 19/006* (2013.01); *G06F 3/017* (2013.01); *G06F 3/0346* (2013.01); *G06T 15/06* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,788,966 B2* | 9/2020 | Goslin | ..................... | G06F 3/017 |
| 10,789,775 B2* | 9/2020 | Maier | ................... | G06T 19/006 |
| 10,976,804 B1* | 4/2021 | Atlas | ....................... | G06F 3/017 |
| 2016/0196692 A1* | 7/2016 | Kjallstrom | .......... | G06F 3/04815 |
| | | | | 345/633 |
| 2019/0004698 A1* | 1/2019 | Harrison | ............. | G06F 3/04886 |
| 2019/0050062 A1* | 2/2019 | Chen | ........................ | G06T 7/70 |
| 2019/0146660 A1* | 5/2019 | Holz | .................. | G06K 9/00389 |
| | | | | 715/771 |

(Continued)

OTHER PUBLICATIONS

Bowman, Doug A., and Larry F. Hodges. "An evaluation of techniques for grabbing and manipulating remote objects in immersive virtual environments." Proceedings of the 1997 symposium on Interactive 3D graphics. 1997.

(Continued)

*Primary Examiner* — Motilewa Good-Johnson
(74) *Attorney, Agent, or Firm* — Baker Botts L.L.P.

(57) ABSTRACT

In one embodiment, a method includes generating a visual interaction tool that moves and extends in a three-dimensional artificial-reality environment according to hand and arm movements of a user. It may be detected that the visual interaction tool intersects a predefined region associated with a virtual item of a first type in the AR environment. The visual interaction tool may attach to the first virtual item. A first operating mode for the visual interaction tool may be selected based on the first type of the first virtual item. The first operating mode may be selected from multiple operating modes for the visual interaction tool. A first input from the user may be received while the visual interaction tool is attached to the first virtual item. First operations with the first virtual item may be performed according to the first operating mode and the first input.

20 Claims, 8 Drawing Sheets

(56) References Cited

U.S. PATENT DOCUMENTS

2019/0212827 A1\* 7/2019 Kin .................... G02B 27/0179
2020/0225736 A1\* 7/2020 Schwarz ................. G06F 3/017

OTHER PUBLICATIONS

Tomozoe, Yusuke & Machida, Takashi & Kiyokawa, Kiyoshi & Takemura, Haruo. (2004). Unified Gesture-Based Interaction Techniques for Object Manipulation and Navigation in a Large-Scale Virtual Environment.. 259-260. 10.1109/VR.2004.81.
Poupyrev, Ivan, et al. "The go-go interaction technique: non-linear mapping for direct manipulation in VR." Proceedings of the 9th annual ACM symposium on User interface software and technology. 1996.

\* cited by examiner

SYSTEMS AND METHODS FOR USER INTERACTION WITH ARTIFICIAL REALITY ENVIRONMENTS

TECHNICAL FIELD

This disclosure generally relates to a user interface for an artificial reality (AR) environment.

BACKGROUND

Artificial reality (AR) is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

The embodiments described in this specification are directed to a visual interaction tool that improves user interaction within an artificial reality (AR) environment. The visual interaction tool allows users to interact with a variety of virtual items within an AR environment, such as user interfaces (UI) in the near field, virtual objects, user interfaces (UI) in the far field, and surfaces on which the user may move. However, the disclosed aspects of interaction are exemplary and it is contemplated that the visual interaction tool may be used with any aspect of interacting with the environment.

Near-field UI interaction is user interaction with UI systems that are in physical proximity to the user within a threshold distance. Near-field UI systems may be right in front of the user in the artificial reality environment (e.g., within arm's reach), such as typing on a keyboard or operating a close-up selection menu. Current solutions include a method of virtually mapping a user's hand to allow the user to directly manipulate the near-field UI. However, it is difficult to accurately aim and for the system to determine the interactions the user wishes to perform. Additionally, direct touch capabilities lack user feedback (e.g., haptic feedback). Finally, requiring the user to perform detailed direct touch motions on a near-field UI increases user fatigue from continually pressing buttons. Thus, there is a need for a solution that is intuitive to a user and increases accuracy.

Interaction with out-of-reach objects is interaction with objects that are out of arm's reach. Interaction with out-of-reach objects is a problem because a user confined to a sphere of movement within an AR environment cannot easily interact with or move to objects just beyond their range of motion. Current solutions include mapping a virtual hand to a position at a distance from the user's hand as a mechanism to increase the user's reach. However, it is difficult to determine which of a plurality of objects the user intends to interact with when there is more than one object in the environment. There is a need for a solution that improves the aiming accuracy of this interaction.

User interaction with far-field UI is interaction with UI systems that are far away from the user, or have a proximity to the user that is beyond a threshold distance. Current solutions include laser pointer functionality. However, laser pointer solutions have deficient accuracy for determining which virtual item the user means to interact with, when there are multiple virtual items beyond the threshold distance from the user. Furthermore, when the user needs to make a selection, the motion of pressing a button may cause the laser pointer to deviate from the target. There is a need for a solution that improves the aiming accuracy and intuitive function of this interaction.

Moving small distances is enabling the user to make small adjustments to their location. Current solutions include teleportation, but do not allow the user to make small adjustments to position when precision is required. There is a need for a solution that allows the user to make small adjustments and that is seamlessly integrated with other capabilities of user interaction.

Current solutions to the above described interactions are a series of separate, distinct tools, each with their own issues. There is a need for a unifying tool; it is cumbersome for users to have to switch between multiple tools when interacting with multiple types of virtual items. For example, a user may wish to perform different interactions in rapid succession (e.g., grabbing and throwing an object, followed by moving a short distance, followed by grabbing another object). To perform these interactions with a series of separate tools requires the user to first select the appropriate tool for object manipulation, perform the object manipulation interaction, then select the tool for moving short distances, perform the movement interaction, and finally select the tool for object manipulation and perform the object manipulation. Having to press buttons frequently to select different tools for every interaction within an AR environment is fatiguing, cumbersome, and inefficient for the user.

The visual interaction tool, in contrast, provides a single tool to allow users to interact with virtual items at any distance and to move short distances without cumbersome selection of means for each capability. The visual interaction tool comprises a combination of capabilities and allows contextually switching between them. The visual interaction tool, additionally, is designed with intuition of physical interaction in mind. Each of the functions of the visual interaction tool may be performed by a user as a close approximation to of those functions as physical interactions. For example, the function of picking up an out-of-reach object with the visual interaction tool was designed to be a close approximation to the physical motion of picking up an object at a distance using a tool. With the use of the visual interaction tool, the function of picking up an out-of-reach object may feel like a direct physical interaction with the object even at a distance. As another example, the function of operating a scroll bar of a user interface with the visual interaction tool was designed to be a close approximation of the feel of physically interacting with a scroll-bar. In this way, the visual interaction tool may make interactions within an AR space feel like intuitive physical interactions to a user. In contrast, the existing solutions (e.g., a tool based on a laser pointer for selecting) are not close approximations of the functionality of physical interaction, which makes them cumbersome and lacking intuition of use.

The visual interaction tool may be activated in response to receiving instructions from the user (e.g., hand-tracking, controller-tracking, user arm extension, and user button press). A proximity of the visual interaction tool may be detected for one or more virtual items. A virtual item may be selected based on the proximity. An operating mode of the visual interaction tool may be selected based on a type of the selected virtual item. Operations with the visual interaction tool may be performed with the virtual item according to the operating mode and in response to a user input.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A visual interaction tool may be activated by a user of an AR system. In particular embodiments, the visual interaction tool may be activated in response to the user pressing a button. For example, there may be a selection button that prompts the visual interaction tool to be activated. The visual interaction tool may move and extend in a three-dimensional AR environment according to hand and arm movements of the user. When the visual interaction tool is activated, it may operate in an operation mode selected from a plurality of operation modes that will be described in further detail below.

Figure 1:
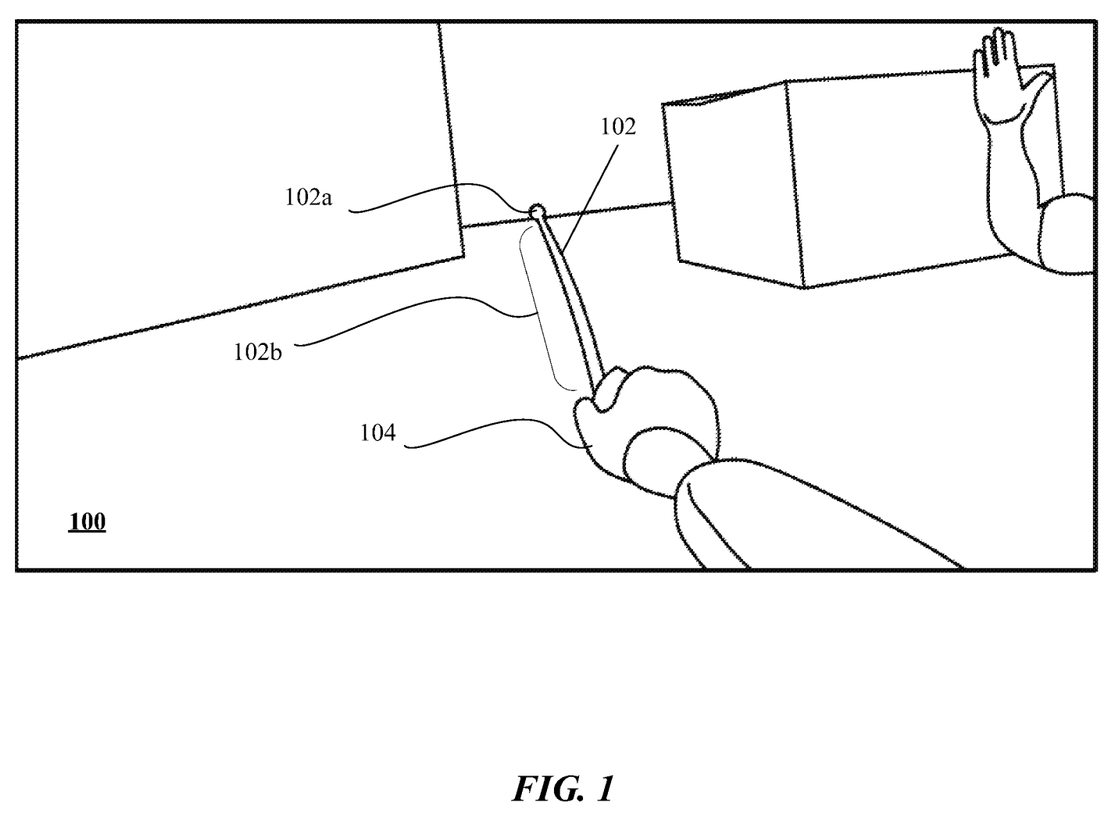
FIG. 1 illustrates a visual interaction tool extending from a position corresponding to the user's hand in an artificial-reality (AR) environment.

FIG. 1 illustrates a visual interaction tool extending from a position corresponding to the user's hand in an artificial-reality (AR) environment. The visual interaction tool 102 may extend into the three-dimensional AR environment 100 from a position corresponding to the user's hand 104. In particular embodiments, the hand 104 may be the physical hand of the user. For example, if the user is wearing an augmented-reality headset that allows the user to see the physical world, the user would be able to see his physical hand. In other embodiments, the hand 104 may be a rendered virtual hand that represents the user's physical hand. In that case, the rendered virtual hand may move in accordance with the tracked pose (e.g., position and orientation) of the user's physical hand. Tracking may be achieved by using computer-vision techniques that track observable features of the user's physical hands. If the user is holding or wearing a controller, tracking may be achieved by tracking the observable features the controller (e.g., IR LEDs on the controller) and/or using the inertial-measuring unit (IMU) of the controller.

Visual interaction tool 102, in particular embodiments, may comprise a visual portion 102b and an endpoint 102a. Visual portion 102b may be generated based on a ray cast extending from a position corresponding to the user's hand 104. The direction of the ray cast may depend on the pose of the user's hand 104. The visual interaction tool 102 may comprise a straight-line segment extending into three-dimensional AR environment 100 from a position corresponding to the user's hand 104. Endpoint 102a may comprise a visual dot. The visual dot may grow in visual weight when it is detected that the visual interaction tool is interacting with a virtual item. The length of extension of the visual interaction tool may vary in response to hand and arm movements of the user. For example, the length of extension of the visual interaction tool may be based on the degree of extension of the user's arm. For example, if the user's arm is fully extended, the visual interaction tool may have a long extension, such as 2.5 m. If the user's arm is at their side, corresponding to zero extension of the user's arm, the visual interaction tool may have a short extension, such as 70 cm. In particular embodiments, the visual interaction tool may extend further in proportion to the amount of extension of the user's arm (e.g., the length of the visual interaction tool may be defined as a function of the user's arm extension). In particular embodiments, the length of extension of the visual interaction tool may be based on the level of depression of the selection button. For example, the visual interaction tool may extend longer or shorter depending on whether the selection button is fully depressed or partially depressed.

Figure 2A:
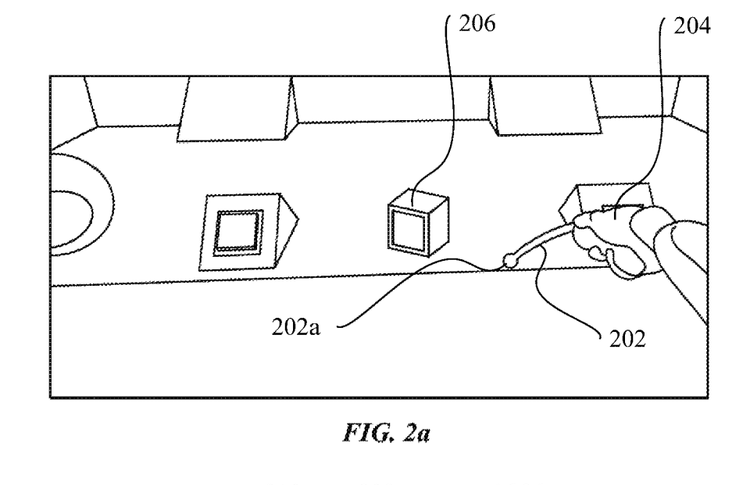
FIGS. 2a, 2b, and 2c illustrate an example of using the visual interaction tool to select a virtual item.
Figure 2B:
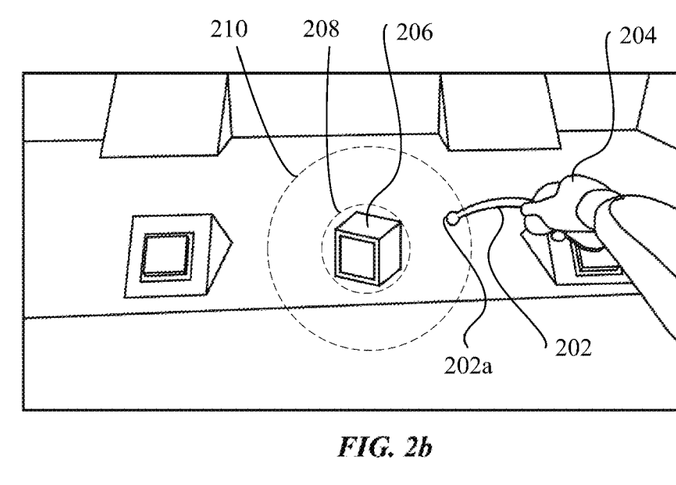

FIGS. 2a, 2b, and 2c illustrate an example of using the visual interaction tool to select a virtual item. A virtual item may be an interactable item in the AR environment, such as an object, user interface, the ground, etc. Certain virtual items may be associated with one or more predefined regions. A first predefined region may be used to determine selection of the virtual item. A predefined region may comprise a volume in a three-dimensional AR environment centered around a virtual item and/or enclosing the virtual item. The size of a predefined region may be larger than the virtual item. A first predefined region may be smaller than a second predefined region. A first predefined region may be defined by the volumetric border of the virtual item itself, or a portion thereof (e.g., in particular embodiments, to select a virtual item, the visual interaction tool may need to touch the volumetric border of the virtual item itself, or a selectable portion thereof). A second predefined region associated with a virtual item may be used to determine a bending of the visual interaction tool towards the virtual item for aiding in selection. In FIG. 2a, visual interaction tool 202 is a straight-line segment with endpoint 202a located a distance from virtual item 206. In particular embodiments, the visual interaction tool may bend in an arc towards a selectable virtual item. The bend may be based on a proximity of an endpoint of a visual interaction tool to virtual item. In FIG. 2b, virtual item 206 is associated with two predefined regions: first predefined region 208 and second predefined region 210. First predefined region 208 is a sphere centered on virtual item 206. Second predefined region 210 is a sphere centered on virtual item 206 and is larger than first predefined region 208. FIG. 2b illustrates an example of a visual interaction tool bending towards a virtual item based on In FIG. 2b, endpoint 202a has touched second predefined region 210, and in response, visual interaction tool 202 bends in an arc towards virtual item 206.

Figure 2C:
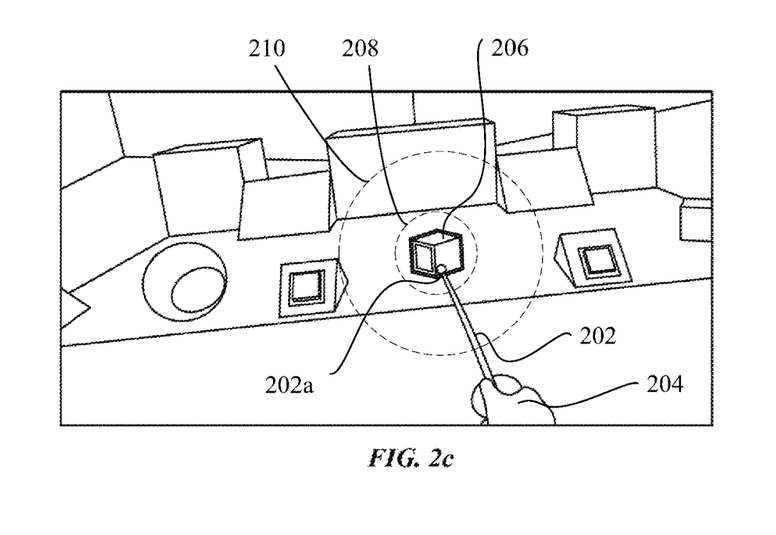

A virtual item may be selected using the visual interaction tool. The visual interaction tool may operate in a Selection Mode initially upon being activated. The user may not need to press a button to select a virtual item while the visual interaction tool operates in Selection Mode. Selection of a virtual item may be based on a proximity of the visual interaction tool to the virtual item. Selection of a virtual item may occur automatically in response to detecting that the visual interaction tool intersects a first predefined region associated with the virtual item. In response to selection of a virtual item, the visual interaction tool may attach to the virtual item. In FIG. 2c, virtual item 206 has been selected based on visual interaction tool 202 intersecting first predefined region 208 associated with virtual item 206. Thereafter, visual interaction tool 202 is attached to virtual item 206. Once endpoint 202a of visual interaction tool 202 is attached to virtual item 206, endpoint 202a may continue to be attached to virtual item 206 even as visual interaction tool 202 is moved around by the user's hand 204, causing the virtual item to move along with the visual interaction tool. This mechanic allows the user to feel as if they are physically manipulating virtual item 206 using the attached visual interaction tool 202. Visual interaction tool 202 may detach from virtual item 206 when a predefined condition is met (e.g., when the use presses or releases a button, when visual interaction tool 202 is beyond a certain distance from virtual item 206, when the user gives a voice command, when virtual item 206 is moved to a particular predefined location or state, etc.).

Different types of virtual items may be associated with different first predefined regions for determining selection. Detecting that the visual interaction tool intersects the first predefined region associated with the virtual item (the first predefined region could be the virtual item itself as well) may be based on a determination that the visual interaction tool is within a threshold distance from the virtual item. When a virtual item is within a threshold distance from the visual interaction tool in the AR environment, then it may be detected that the visual interaction tool intersects the first predefined region associated with the virtual item. Selection of a virtual item may be based on a pointing direction of the visual interaction tool.

A virtual item may correspond to a type of virtual item of a plurality of types of virtual items. The plurality of types of virtual items could include an object, a user-interface (UI), a scroll bar on a UI, a button on a UI, an avatar of another user, or a surface on which a user is configured to move. A type of a virtual item may indicate one or more properties of the virtual item.

In response to selection of a virtual item, the visual interaction tool may attach to the virtual item. Based on the type of virtual item that the visual interaction tool is attached to, an operating mode for the visual interaction tool may be selected from a plurality of operating modes. The type of the virtual item may indicate that the virtual item is a manipulatable object. For example, an operating mode for the visual interaction tool may comprise object manipulation based on the virtual item being a manipulatable object. Operations with the virtual item according to object manipulation operating mode may be moving the virtual item in the AR environment. As another example, the type of the virtual item may indicate that the virtual item is a user interface. An operating mode for the visual interaction tool may comprise a user interface operation based on the virtual item being a user interface. As yet another example, the type of the virtual item may indicate that the virtual item is a surface on which the user is configured to move. An operating mode for the visual interaction tool may comprise locomotion based on the virtual item being a surface on which the user is configured to move.

In particular embodiments, the type of the virtual item may indicate that that virtual item is a user interface. The virtual item may be designed to be used when it is within a threshold distance from the user. When the user selects the virtual item of the user-interface type, an operating mode of the visual interaction tool may be selected from a plurality of operating modes. The plurality of operating modes may be predefined at a system level or custom defined by the application that has generated the virtual item. The operating mode may comprise a user interface operating mode selected from a plurality of user interface operating modes, depending on the particular type of user interface selected by the visual interaction tool. For example, the plurality of user interface operating modes of the visual interaction tool may comprise a mode for button pressing, a mode for operating a user interface slide bar, or any other mode according to functionalities of the user interface.

Figure 3A:
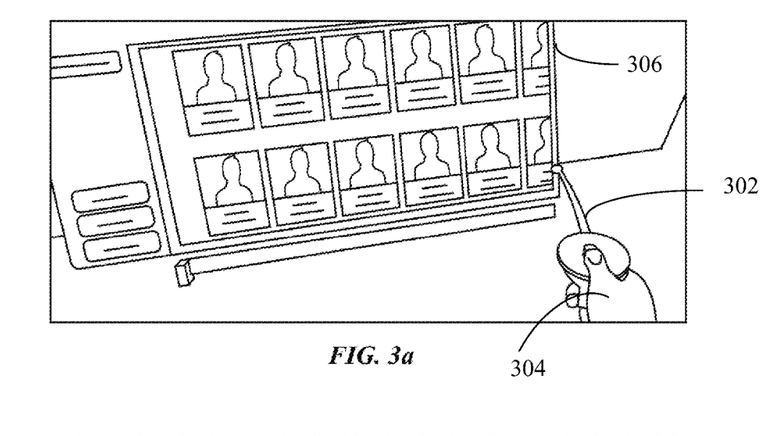
FIGS. 3a, 3b, 3c, and 3d illustrate an example of using the visual interaction tool to interact with a user interface (UI) in the near field.
Figure 3B:
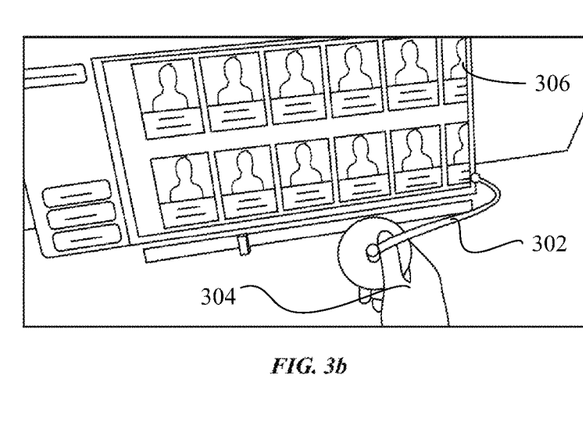

FIGS. 3a, 3b, 3c, and 3d illustrate examples of using the visual interaction tool to interact with a user-interface (UI) in the near field. FIGS. 3a and 3b illustrate an example of the user moving a user-interface (UI) window with an attached visual interaction tool. In FIG. 3a, visual interaction tool 302 has attached to user-interface window 306. In FIG. 3b, the user is moving visual interaction tool 302 to move user-interface window 306 to another location. Movement of the user is illustrated by movement of user's hand 304.

Figure 3C:
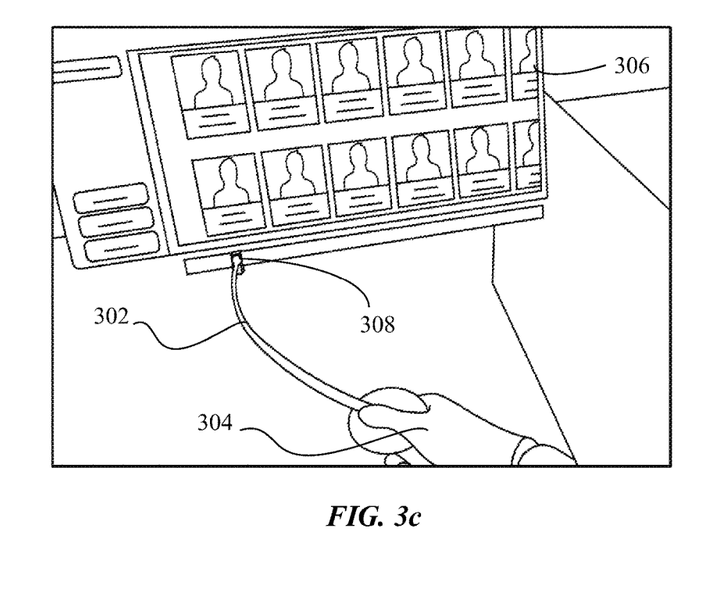

In FIG. 3c, visual interaction tool 302 is attached to scroll bar 308 of user-interface window 306. The operations of scroll bar 308 may be to scroll through a plurality of elements of user interface 306. As illustrated in FIG. 3c, visual interaction tool 302 may be visible while attached to scroll bar 308. Scroll bar 308 may scroll through the elements of user interface 306 in response to the user moving visual interaction tool 302. In FIG. 3c, the elements of user interface 306 comprise avatars of other users. This mechanic allows the user to feel as if they are physically manipulating scroll bar 308 using the attached visual interaction tool 302.

Figure 3D:
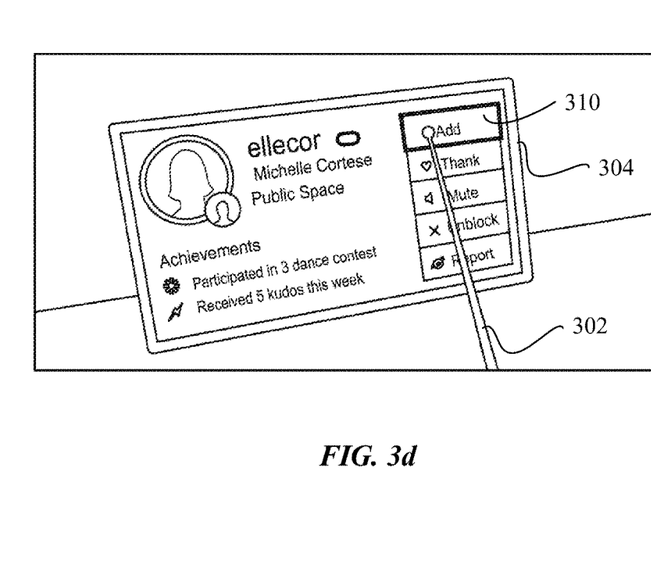

In FIG. 3d, button 310 is a virtual item on user interface window 304. In response to determining that button 310 is a button user interface, an operating mode of visual interaction tool 302 may be selected to be a button pressing mode. In FIG. 3d, visual interaction tool 302 may perform button pressing operations comprising pressing button 310 according to receiving instructions from the user. For example, visual interaction tool 302 may remain rigid and would not attach to any of the buttons when contact is made (e.g., visual interaction tool 302 acts like a stick for pressing buttons). In particular embodiments, in response to the visual interaction tool intersecting a first predefined region associated with a user interface button (e.g., in this case, the region may be larger than the button), the visual interaction tool may automatically snap to the center of the button to assist the user with aiming. While the visual interaction tool intersects the first predefined region associated with the user interface button, the visual interaction tool may remain snapped to the center of the button.

Figure 4A:
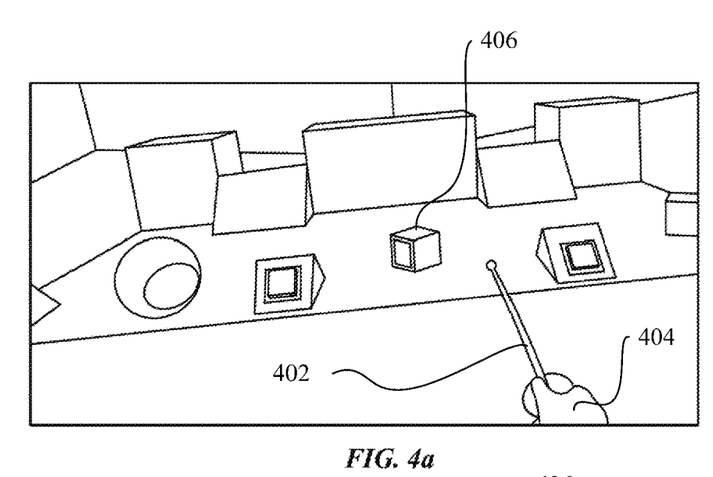
FIGS. 4a, 4b, 4c, and 4d illustrate an example of using the visual interaction tool to select and manipulate a moveable virtual object.
Figure 4B:
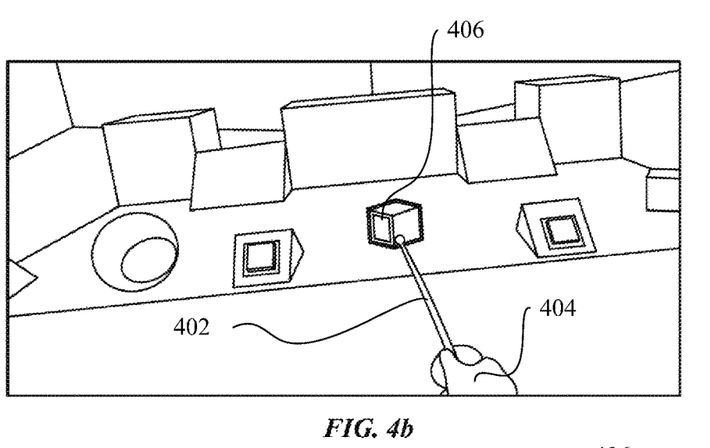
Figure 4C:
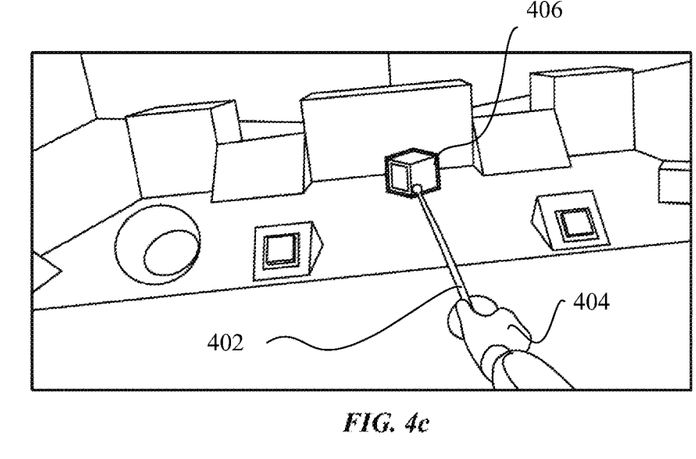
Figure 4D:
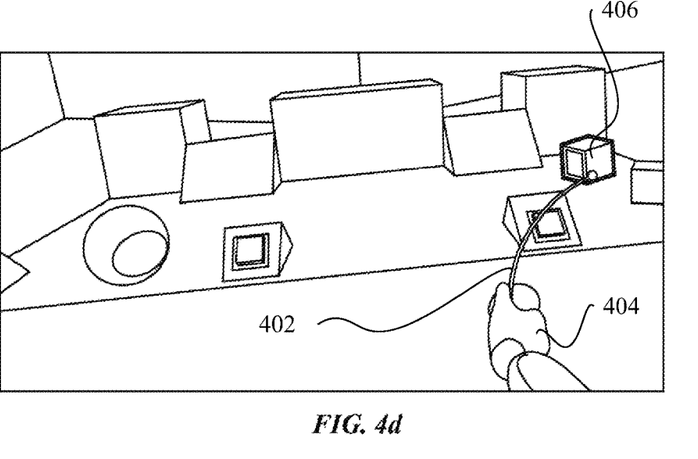

FIGS. 4a, 4b, 4c, and 4d illustrate an example of using the visual interaction tool to select and manipulate a moveable virtual object. The type of virtual item 406 may indicate that virtual item 406 is an object that can be moved. Selection of object 406 may occur automatically in response to the visual interaction tool intersecting a first predefined region associated with the object 406. On selecting object 406 with visual interaction tool 402, visual interaction tool 402 may attach to object 406 (e.g., when visual interaction tool 402 touches any part of object 406, visual interaction tool 402 would appear to attach to object 406 without further input from the user). When object 406 is connected in this way, object 406 may move in the AR environment according to hand and arm motions of the user. In FIG. 4a, visual interaction tool 402 is being moved by the user's hand 404 towards object 406. Selection of object 406 may occur in response to a determination that visual interaction tool 402 intersects a first predefined region associated with object 406 (e.g., the first predefined region may be any part of object 406). In FIG. 4b, visual interaction tool 402 is shown to be attached to object 406 in response to selection of object 406. In FIG. 4c, object 406 is attached to visual interaction tool 402 and object 406 moves in the AR environment along with visual interaction tool 402. As an example, the user may manipulate the selected object by continuing to hold it at a distance. As another example, the user may perform an action that may cause visual interaction tool 402 and the attached object 406 to retract closer to the user or to retract into a position corresponding to the user's hand 404. As another example, the user may manipulate object 406 using visual interaction tool 402, such as by throwing object 406. FIG. 4d shows object 406 being held at a distance by visual interaction tool 402 while the user's hand 404 is moving laterally to the left, causing the visual interaction tool 402 to bend. Object 406 attached to the end of visual interaction tool 402 would move with visual interaction action tool 402. During this motion, the user may decide on a point of release by, for example, pressing or releasing a button. At that instant, object 406 would detach from visual interaction tool 402. The subsequent motion of object 406 may be computed according to, for example, the launch speed and angle of object 406 at the time of release.

Figure 5A:
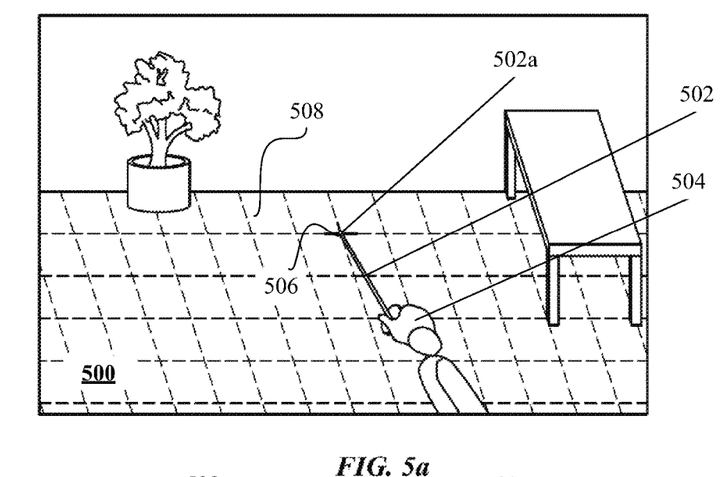
FIGS. 5a, 5b, 5c, and 5d illustrate an example of using the visual interaction tool to move small distances within an artificial-reality (AR) environment.
Figure 5B:
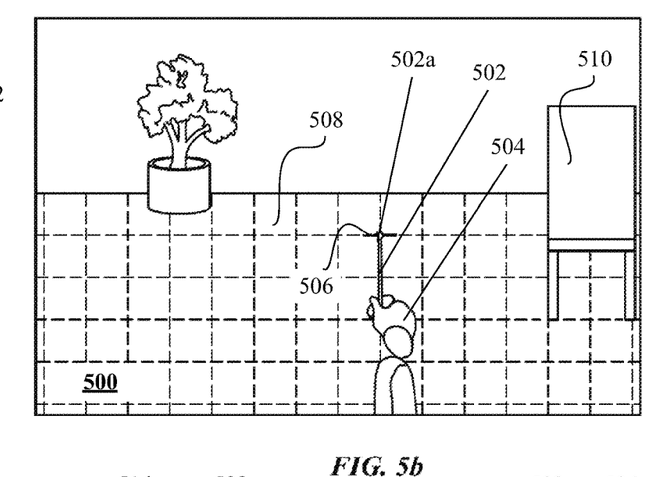

FIGS. 5a, 5b, 5c, and 5d illustrate an example of using the visual interaction tool to move small distances within an artificial-reality (AR) environment. An interactable virtual item may be a surface on which the user is configured to move (e.g., the floor, a wall, etc.). An operating mode for the visual interaction tool may be set to locomotion when the tool is attached to such a virtual item. The visual interaction tool may automatically enter the locomotion mode if the virtual item selected comprises a surface on which the user is configured to move. A surface on which the user is configured to move may be a floor or wall of the AR environment. When the extended visual interaction tool comes into contact with a surface on which the user is configured to move, the surface may be selected by the visual interaction tool. The visual interaction tool may, on selection of a surface, anchor onto a point on the surface. In FIG. 5a, visual interaction tool 502 may extend into three-dimensional AR environment 500 from a position corresponding to the user's hand 504. Visual interaction tool 502 is anchored by endpoint 502a onto point 506 on floor 508. Floor 508 is a surface on which the user is configured to move. The user may use visual interaction tool 502 anchored to point 506 on floor 508 to make adjustments to their location. These adjustments may comprise small movements across the two-dimensional plane of floor 508. In FIG. 5a, the user is located at a position when the visual interaction tool 502 is used to attach to point 506 on floor 508. In FIG. 5b, the user has made a small adjustment to their location laterally to the right, resulting in a new location that is closer to table 510. The lateral movement may be achieved by the user moving their arm or hand 504 towards the left while visual interaction tool 502 is attached to point 506. This motion pushes the user's position within three-dimensional AR environment 500 towards the right, resulting in the user's new location shown in FIG. 5b. The amount of the user's movement within AR environment 500 may be directly proportional to the amount and/or speed of the user's arm or hand 504 movement. When the user is satisfied with the new location, the user may release visual interaction tool 502 from floor 508. To continue moving to other locations, the user may repeat the process of attaching visual interaction tool 502 to floor 508, moving their arm, and releasing visual interaction tool 502. The mechanics for locomotion provides the user with fine-grain control over their movements in AR and the feeling that they are moving through physical means (e.g., pushing and pulling their body using a tool anchored to the floor).

Figure 5C:
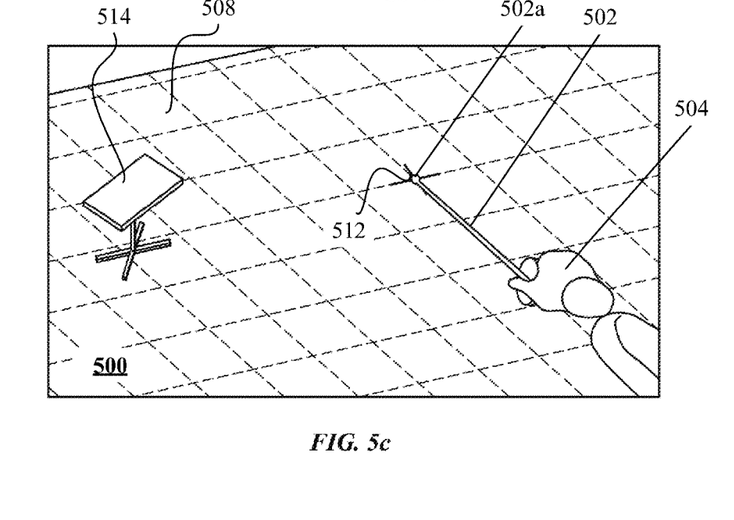
Figure 5D:
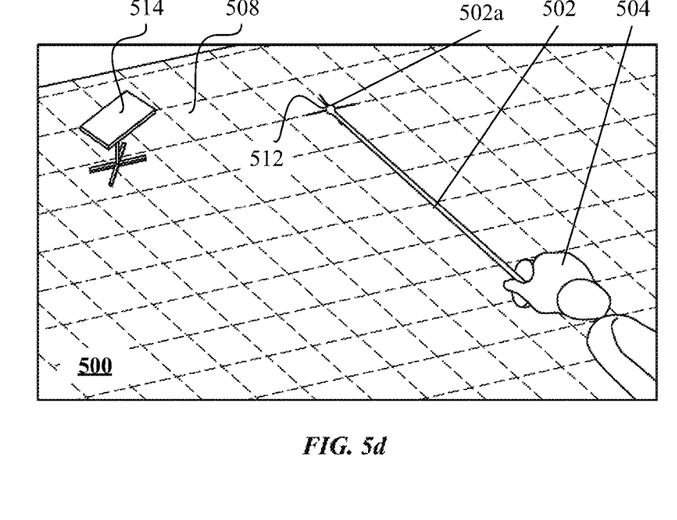

FIGS. 5c and 5d illustrate an embodiment where the user may use the visual interaction tool to push and/or pull them away from/towards the anchor point. In FIG. 5c, visual interaction tool 502 is anchored by endpoint 502a onto point 512 on floor 508. Floor 508 is a surface on which the user is configured to move. The user may use visual interaction tool 502 anchored to point 512 on floor 508 to make adjustments to their location. These adjustments may comprise small movements across the two-dimensional plane of floor 508. In FIG. 5c, the user is located at a position when visual interaction tool 502 is used to attach to point 512 on floor 508. In FIG. 5d, the user has made a small adjustment to their location by moving backwards, resulting in a new location that is further from desk 514. The movement backwards may be achieved by the user pressing a button to extend visual interaction tool 502. The extension pushes the user's position away from point 512, backwards in three-dimensional AR environment 500.

In locomotion mode, the user may be configured to move along the surface in the AR environment in response to instructions from the user. For example, the user may move along the surface according to hand and arm motions of the user. As another example, the user could activate a visual interaction tool extending from each of the user's two hands. The user may use locomotion mode with both of these visual interaction tools in an alternating fashion. This mechanic provides the user with the feeling that they are walking through the three-dimensional AR space with physical means (e.g., alternating pushing and/or pulling their body using a tool with each of their hands, simulating the feeling of walking via alternating steps).

As another example, the user may be able to move along the surface with momentum. The user may be able to click and drag within the AR environment to give momentum to the user moving along the surface. As another example, if the surface is a wall, then the user may be configured to move along the wall by climbing. The visual interaction tool may, on selection of the surface, anchor onto a point on the wall. The Locomotion mode may comprise operations allowing the user to climb the wall.

In particular embodiments, the visual interaction tool may be used to interact with an interactable virtual item, such as a user interface that is positioned beyond a threshold distance from the first user (e.g., beyond a predetermined distance or the arm's reach of the user). Such a user interface may be referred to as a user interface in the far field.

Figure 6:
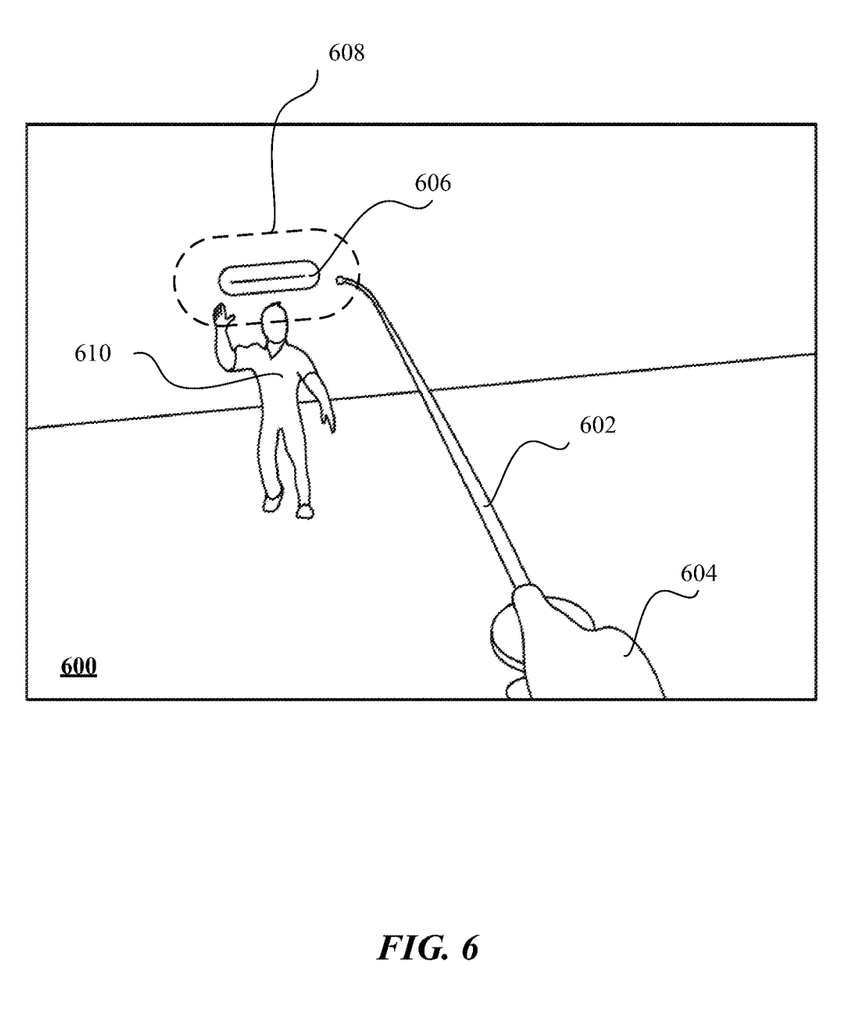
FIG. 6 illustrates an example of using the visual interaction tool to interact with a UI in the far field.

FIG. 6 illustrates an example of using the visual interaction tool to interact with a UI in the far field. In FIG. 6, visual interaction tool 602 extends from a position corresponding to the user's hand 604 and bends towards virtual item 606 in three-dimensional AR environment 600. Virtual item 606 is a user interface in the far field that is associated with another user 610. Virtual items in the far field may be more difficult for the user to target for selection than other virtual items. To aid the user, there may be a predefined region associated with a virtual item. As illustrated in FIG. 6, a predefined region 608 may be a three-dimensional region or volume in a three-dimensional AR environment 600, where the outer border of region 608 is a fixed distance away from visual item 606. When it is detected that visual interaction tool 602 intersects predefined region 608, visual interaction tool 602 may bend towards virtual item 606. This mechanic of bending towards selectable virtual items in the far field not only informs the user of what virtual items in the far field are selectable, it also decreases the distance between the extended visual interaction tool and the virtual item, thereby making selection easier. If the user wishes to make a selection, they may move visual interaction tool 602 towards selectable virtual item 606 until the two intersect. When that occurs, visual interaction tool 602 may attach to virtual item 606 to provide visual confirmation that virtual item 606 is currently being selected. While virtual item 606 is selected, the user may provide further input to trigger any functionality of virtual item 606. For example, while virtual item 606 is selected, the user may press a button to cause the profile data of the other user 610 to be shown (e.g., name, profile picture, interests, etc.). In particular embodiments, the user may be given a window of time in which to make a decision about whether to select that virtual item. In that time window, the user may move the visual interaction tool away from the virtual item, preventing selection of the virtual item; otherwise, if the visual interaction tool continues to be within the second predefined region, the visual interaction tool may continue to extend towards the virtual item until the two intersect.

A visual aid may alert the user that the user may decide either to move the visual interaction tool away from the virtual item, or move the visual interaction tool to intersect the virtual item, completing selection of the virtual item. The visual aid may be that the visual interaction tool bends in an arc towards the virtual item in response to a detection that the visual interaction tool intersects a second predefined region associated with the virtual item. In FIG. 6, visual interaction tool 101 is intersecting a second predefined region associated with virtual item 603, visually shown by the bend in visual interaction tool 101 towards virtual item 603.

In particular embodiments, the bend in the visual interaction tool may become either more pronounced or less pronounced in proportion to the distance between the visual interaction tool and the virtual item. A bend in response to interaction with a second predefined region may be a visual aid to the user that the visual interaction tool is close to intersecting a visual item and thus close to selection of a visual item.

In particular embodiments, in response to the user moving the visual interaction tool away from a virtual item, the visual interaction tool may detect the proximity of an additional virtual item or a plurality of virtual items. The visual interaction tool may bend towards an additional virtual item based on the proximity (e.g., the tool would bend towards the closest virtual item).

When detecting that the visual interaction tool intersects the second predefined region associated with a virtual item, the visual interaction tool may comprise a straight-line segment and may not intersect the virtual item. The visual interaction tool may bend in an arc towards the virtual item in response to detecting that the visual interaction tool intersects a second predefined region associated with a virtual item. The visual interaction tool may comprise a straight-line segment in response to detecting that the visual interaction tool no longer intersects the second predefined region of the virtual item.

In particular embodiments, the visual interaction tool may detect the existence of a far-field virtual item that may be selected and, in response, extend automatically to aid the user with selecting that item. For example, when the visual interaction tool is short and not extended, the end point of the tool may be far away from a selectable far-field virtual item. However, had the tool been longer, the tool may be sufficiently close to the far-field virtual item to trigger the aforementioned visual aid to help the user select the virtual item. In particular embodiments, the visual interaction tool may detect such scenarios and automatically extend so that its endpoint is closer to the far-field virtual item. To achieve this, particular embodiments of the visual interaction tool may comprise a visible first portion generated based on a first ray cast extending from a position corresponding to the user's hand. The first portion of the visual interaction tool may be visible to the user. The visual interaction tool may further comprise an invisible second portion that corresponds to a second ray cast extending from the position corresponding to the user's hand. The second portion may be invisible to the user since it is being used to assess the possibility of far-field intersections. The second portion may extend a distance greater than the length of the first portion. For example, the length of the invisible second portion may be 15 meters, 30 meters, or boundless, while the length of the visible first portion may be 0.5, 1, or 1.5 meters. The invisible second portion of the visual interaction tool may be used to detect and select objects that are further away than the typical extension of the visible first portion. In response to a determination that the invisible second portion intersects a first or second predefined region associated with a virtual item, the visible first portion of the visual interaction tool may extend to a length sufficient for reaching the virtual item in the AR environment.

In particular embodiments, the visual interaction tool may be detected to be in proximity with each of a plurality of first predefined regions associated with a plurality of virtual items. The plurality of virtual items may comprise a plurality of types. One of the plurality of virtual items may be selected based on the associated proximities according to one or more priority rules. The priority rules may dictate that the types of virtual items may have priority over each other. The priority rules may dictate that each of a plurality of virtual items has a priority value based on the type of virtual item and further based on a proximity to the user. Of the plurality of virtual items detected to be in proximity to the visual interaction tool, the virtual item with the highest priority value may be selected. For example, the type of virtual item being a user interface that is within a threshold distance from the position corresponding to a user may have the highest priority value. The type of virtual item being an object may have the next-highest priority value. The type of virtual item being a user interface that is beyond a threshold distance from the position corresponding to the user may have the next-highest priority. The type of virtual item being a surface on which the user is configured to move may have the lowest priority value.

Figure 7:
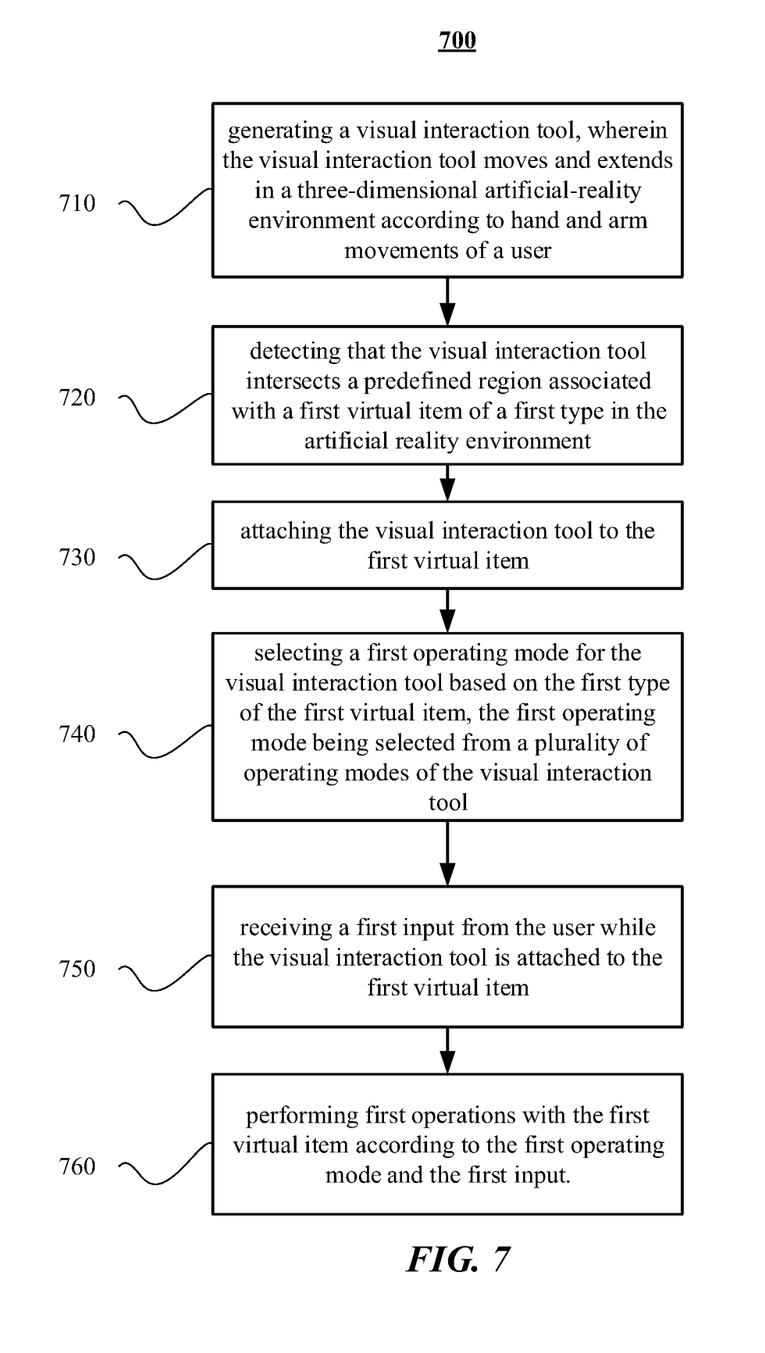
FIG. 7 illustrates an example method for interacting with virtual items in an artificial-reality (AR) environment.

FIG. 7 illustrates an example method for interacting with virtual items in an artificial-reality (AR) environment. The method may begin at step 710, a visual interaction tool may be generated, wherein the visual interaction tool moves and extends in a three-dimensional artificial-reality environment according to hand and arm movements of a user. At step 720, it may be detected that the visual interaction tool intersects a predefined region associated with a first virtual item of a first type in the artificial reality environment. At step 730, the visual interaction tool may be attached to the first virtual item. At step 740, a first operating mode for the visual interaction tool may be selected based on the first type of the first virtual item, the first operating mode being selected from a plurality of operating modes of the visual interaction tool. At step 750, a first input from the user may be received while the visual interaction tool is attached to the first virtual item. At step 760, first operations with the first virtual item may be performed according to the first operating mode and the first input. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for interacting with virtual items in an artificial-reality environment including the particular steps of the method of FIG. 7, this disclosure contemplates any suitable method for interacting with virtual items in an artificial-reality environment including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
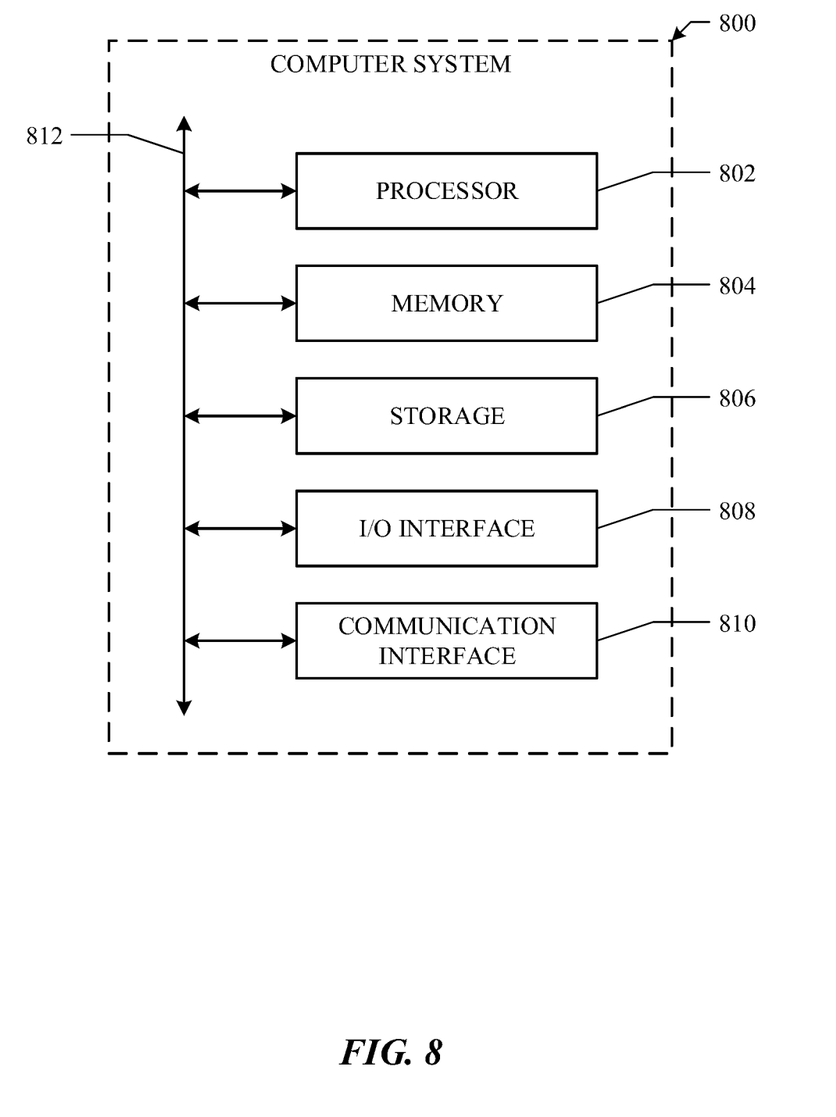
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   generating a visual interaction tool, wherein the visual interaction tool (1) moves and extends in a three-dimensional artificial-reality environment according to hand and arm motions of a user and (2) is capable of switching between a plurality of operating modes when interacting with different types of virtual items;
   detecting that the visual interaction tool intersects a predefined region associated with a first virtual item, the predefined region being a volume larger than and centered around the first virtual item;
   in response to detecting that the visual interaction tool intersects the predefined region, automatically identifying a first type of the first virtual item from a plurality of types of virtual items;
   selecting a first operating mode for the visual interaction tool based on the first type of the first virtual item, the first operating mode being selected from the plurality of operating modes of the visual interaction tool, wherein the plurality of operating modes correspond to the plurality of types of virtual items;
   attaching the visual interaction tool to the first virtual item;
   receiving a first input from the user while the visual interaction tool is attached to the first virtual item; and
   performing first operations with the first virtual item according to the first operating mode and the first input.

2. The method of claim 1, further comprising:
   detaching the visual interaction tool from the first virtual item;
   attaching the visual interaction tool to a second virtual item of a second type;
   selecting a second operating mode for the visual interaction tool based on the second type, the second operating mode being selected from the plurality of operating modes of the visual interaction tool;
   receiving a second input from the user while the visual interaction tool is attached to the second virtual item; and
   performing second operations with the second virtual item according to the second operating mode and the second input, wherein the second operations are different from the first operations.

3. The method of claim 1, wherein the visual interaction tool comprises a visible portion generated based on a first ray cast from a position corresponding to the user's hand, wherein detecting that the visual interaction tool intersects the predefined region is based on a second ray cast that is invisible to the user, and wherein the second ray cast extends a distance greater than a length of the visible portion of the visual interaction tool.

4. The method of claim 3, wherein, in response to the second ray cast intersecting the predefined region associated with the first virtual item, the visible portion of the visual interaction tool extends to the first virtual item.

5. The method of claim 1, wherein detecting that the visual interaction tool intersects the predefined region associated with the first virtual item is based on a determination that the first virtual item is within a threshold distance from the visual interaction tool in the artificial-reality environment.

6. The method of claim 1, further comprising determining a pointing direction of the visual interaction tool based on instructions from the user, wherein detecting that the visual interaction tool intersects the predefined region associated with the first virtual item is based on the pointing direction of the visual interaction tool.

7. The method of claim 1, further comprising:
   detecting a proximity of the visual interaction tool to each of a plurality of predefined regions associated with a plurality of virtual items of a plurality of types; and selecting one of the plurality of virtual items based on the associated proximities according to one or more priority rules.

8. The method of claim 1, wherein the visual interaction tool is generated in response to receiving instructions indicating that the user has pressed a selection button.

9. The method of claim 8, wherein the visual interaction tool is detached from the first virtual item in response to receiving instructions indicating that the user has released the selection button.

10. The method of claim 1, wherein the first type of the first virtual item indicates that the first virtual item is a manipulatable object, and the first operating mode comprises object manipulation.

11. The method of claim 10, wherein the first operations comprise moving the first virtual item in the artificial-reality environment.

12. The method of claim 1, wherein the first type of the first virtual item indicates that the first virtual item is a user interface, and the first operating mode comprises a user interface operation.

13. The method of claim 1, wherein the first type of the first virtual item indicates that the first virtual item is a virtual representation of another user, and the first operations comprise loading a user profile of the other user.

14. The method of claim 1, wherein the first type of the first virtual item indicates that the first virtual item is a user interface with a slide bar, and the first operating mode comprises a slide bar operation.

15. The method of claim 1, wherein the first type of the first virtual item indicates that the first virtual item is a surface on which the user is configured to move, and the first operating mode comprises locomotion.

16. The method of claim 15, wherein the first virtual item is a floor or a wall in the artificial-reality environment.

17. The method of claim 1, wherein when detecting that the visual interaction tool intersects the predefined region associated with the first virtual item, the visual interaction tool is a straight line segment and does not intersect the first virtual item.

18. The method of claim 17, further comprising arching the visual interaction tool towards the first virtual item in response to the detection that the visual interaction tool intersects the predefined region.

19. One or more computer-readable non-transitory storage media embodying software that is operable when executed to:
generate a visual interaction tool, wherein the visual interaction tool (1) moves and extends in a three-dimensional artificial-reality environment according to hand and arm motions of a user and (2) is capable of switching between a plurality of operating modes when interacting with different types of virtual items;
detect that the visual interaction tool intersects a predefined region associated with a first virtual item, the predefined region being a volume larger than and centered around the first virtual item;
in response to detecting that the visual interaction tool intersects the predefined region, automatically identify a first type of the first virtual item from a plurality of types of virtual items;
select a first operating mode for the visual interaction tool based on the first type of the first virtual item, the first operating mode being selected from the plurality of operating modes of the visual interaction tool, wherein the plurality of operating modes correspond to the plurality of types of virtual items;
attach the visual interaction tool to the first virtual item;
receive a first input from the user while the visual interaction tool is attached to the first virtual item; and
perform first operations with the first virtual item according to the first operating mode and the first input.

20. A system comprising:
one or more processors; and
one or more computer-readable non-transitory storage media coupled to one or more processors and comprising instructions operable when executed by one or more processors to cause the system to:
generate a visual interaction tool, wherein the visual interaction tool (1) moves and extends in a three-dimensional artificial-reality environment according to hand and arm motions of a user and (2) is capable of switching between a plurality of operating modes when interacting with different types of virtual items;
detect that the visual interaction tool intersects a predefined region associated with a first virtual item, the predefined region being a volume larger than and centered around the first virtual item;
in response to detecting that the visual interaction tool intersects the predefined region, automatically identify a first type of the first virtual item from a plurality of types of virtual items;
select a first operating mode for the visual interaction tool based on the first type of the first virtual item, the first operating mode being selected from the plurality of operating modes of the visual interaction tool, wherein the plurality of operating modes correspond to the plurality of types of virtual items;
attach the visual interaction tool to the first virtual item;
receive a first input from the user while the visual interaction tool is attached to the first virtual item; and
perform first operations with the first virtual item according to the first operating mode and the first input.

* * * * *